(12) United States Patent
Sime

(10) Patent No.: US 10,498,197 B2
(45) Date of Patent: Dec. 3, 2019

(54) VEHICLE PROPULSION SYSTEM AND ELECTRIC MOTOR FOR A VEHICLE PROPULSION SYSTEM

(71) Applicant: GM GLOBAL TECHNOLOGY OPERATIONS LLC, Detroit, MI (US)

(72) Inventor: Karl A Sime, Mason, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 428 days.

(21) Appl. No.: 15/588,794

(22) Filed: May 8, 2017

(65) Prior Publication Data

US 2018/0323682 A1 Nov. 8, 2018

(51) Int. Cl.
*H02K 9/00* (2006.01)
*H02K 9/19* (2006.01)
*B60K 1/00* (2006.01)
*H02K 7/00* (2006.01)

(52) U.S. Cl.
CPC ............... *H02K 9/19* (2013.01); *B60K 1/00* (2013.01); *H02K 7/006* (2013.01); *B60K 2001/006* (2013.01)

(58) Field of Classification Search
CPC .... H02K 9/19; H02K 7/006; B60K 2001/006; B60K 1/00

USPC ...................... 310/52, 54, 60 R, 61
See application file for complete search history.

(56) References Cited

U.S. PATENT DOCUMENTS

| | | | |
|---|---|---|---|
| 2,470,488 A * | 5/1949 | Honerkamp | F24F 13/06 454/308 |
| 4,311,932 A | 1/1982 | Olson | |
| 5,218,998 A * | 6/1993 | Bakken | F24F 13/12 137/625.28 |
| 5,602,435 A * | 2/1997 | Iseli | H02K 9/10 310/55 |
| 6,727,609 B2 | 4/2004 | Johnsen | |
| 7,239,055 B2 | 7/2007 | Burgman et al. | |
| 8,138,642 B2 | 3/2012 | Lemmers et al. | |
| 8,970,075 B2 | 3/2015 | Rippel et al. | |
| 9,246,369 B2 | 1/2016 | Tamai et al. | |
| 2005/0156471 A1* | 7/2005 | Kobayashi | H02K 9/19 310/61 |
| 2012/0299404 A1* | 11/2012 | Yamamoto | H02K 1/2766 310/61 |

* cited by examiner

*Primary Examiner* — Hanh N Nguyen

(57) ABSTRACT

A vehicle propulsion system includes a rotor shaft defining a cavity within the rotor shaft and a radial hole extending from the cavity to an external surface of the rotor shaft, and a restrictor that reduces a flow of liquid through the radial hole in response to a rotational speed of the hollow rotor shaft exceeding a predetermined threshold rotational speed.

20 Claims, 6 Drawing Sheets

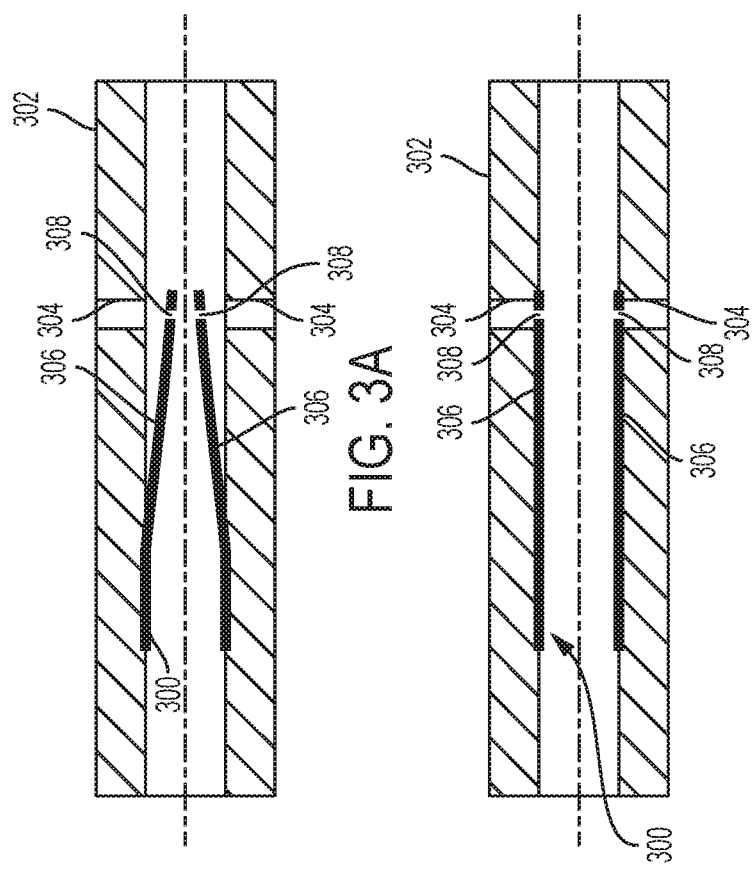

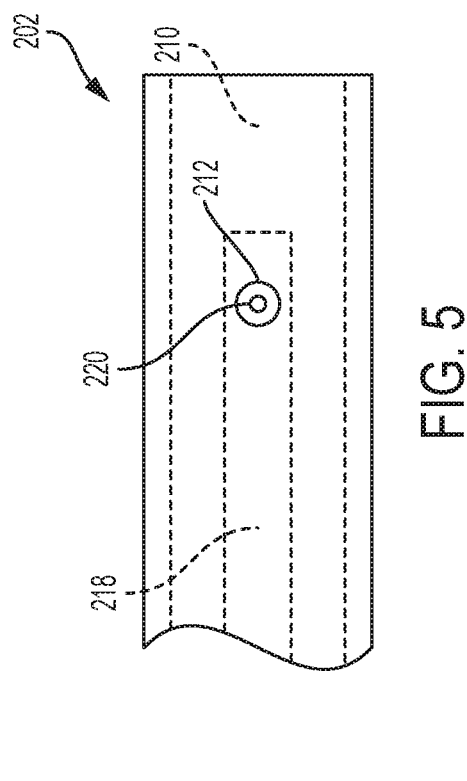
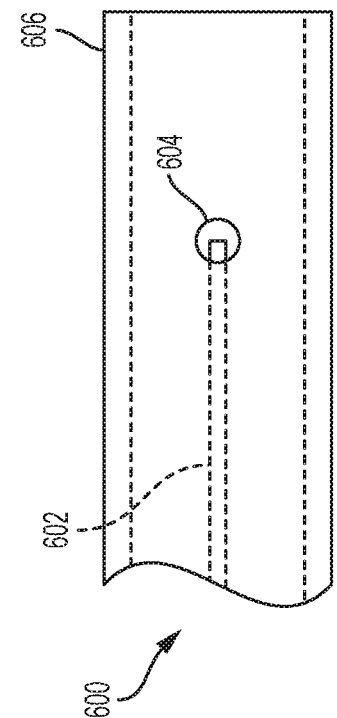
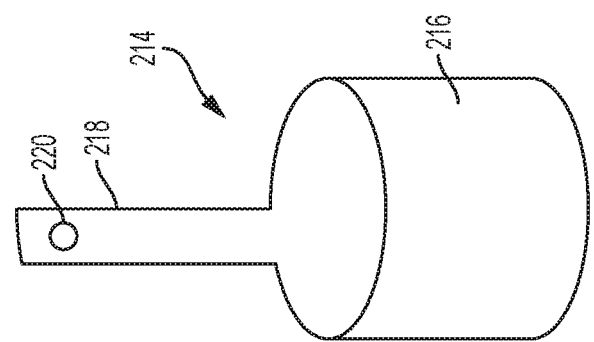

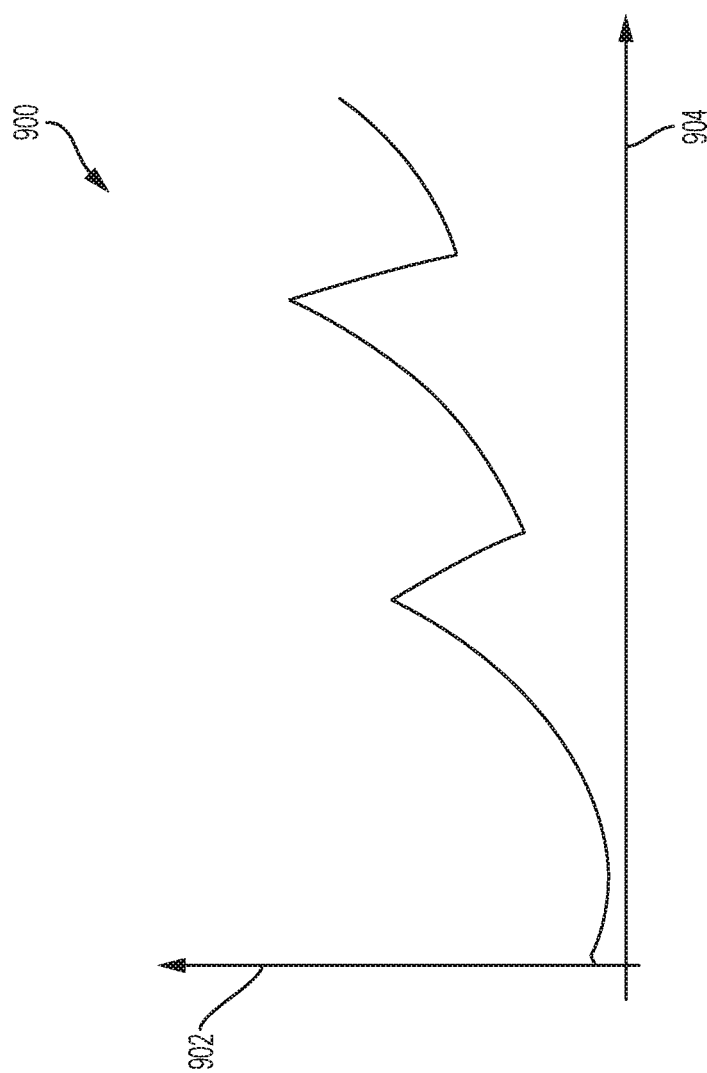

VEHICLE PROPULSION SYSTEM AND ELECTRIC MOTOR FOR A VEHICLE PROPULSION SYSTEM

FIELD

The present disclosure relates to vehicle propulsion system and electric motor for a vehicle propulsion system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

A vehicle propulsion system may include an electric motor that generates torque that is provided to the wheels of the vehicle. Operation of the electric motor may generate heat that needs to be managed to optimize the operation and to avoid or reduce heat related damage. Cooling and lubrications systems have been developed to manage the heat and friction that may be generated by the electric motor. Liquid cooling and lubricating systems provide a flow of liquid coolant or lubricant to the motor and may circulate that liquid through the motor. One type of electric motor liquid system may provide a supply of liquid coolant or lubricant into a hollow rotor shaft which has a radial hole through which the liquid passes radially outward from the shaft. The liquid then becomes exposed to other components of the motor to receive heat from or to lubricate those components and, subsequently, the heated liquid may be circulated away from those components.

Electric motor liquid systems which provide liquid from a cavity within a rotor shaft radially outward through holes in the rotor shaft may have several problems. In general, the volume of flow through the radial hole may be proportional to the size of the hole and the rotational speed of the motor (due to centrifugal force) and the volume of flow of liquid may be directly proportional to the capacity of the flow to remove heat or to lubricate. An electric motor may generate a high amount of heat even when operating at low speeds. To avoid overheating the motor in such a situation, the size of the radial hole must be sufficiently large so that it will allow a flow of liquid that is sufficient to remove this heat at the low speeds. As the speed of the motor increases, the flow of liquid increases and may exceed the amount of flow which is necessary to remove the heat being generated. This excessive supply of liquid is a problem because the rotation of the rotor in the liquid results in spin losses. The higher the flow of liquid, the higher the spin losses. The energy expended in overcoming the spin losses results in reduced fuel economy. It is desirable to provide a flow of liquid which is sufficient to remove heat being generated by the motor without providing an excessive amount of liquid that would unnecessarily reduce the fuel economy of the vehicle.

SUMMARY

In an exemplary aspect, a vehicle propulsion system includes a rotor shaft defining a cavity within the rotor shaft and a radial hole extending from the cavity to an external surface of the rotor shaft, and a restrictor that reduces a flow of liquid through the radial hole in response to a rotational speed of the hollow rotor shaft exceeding a predetermined threshold rotational speed.

In another exemplary aspect, the restrictor reduces the flow in response to a centrifugal force exceeding a predetermined threshold.

In another exemplary aspect, the restrictor includes a cylindrical portion configured to position the restrictor within the cavity.

In another exemplary aspect, the restrictor includes a restrictor arm axially extending within the rotor shaft cavity.

In another exemplary aspect, the restrictor arm defines a restrictor hole that is smaller in cross-section than the radial hole in the rotor shaft.

In another exemplary aspect, a width of the restrictor arm adjacent to the radial hole is less than a distance across the radial hole in a direction aligned with the width of the restrictor arm.

In another exemplary aspect, the restrictor arm includes a spring steel arm with an extent that is biased radially inward away from the radial hole.

In another exemplary aspect, the restrictor reduces the flow of liquid when the rotor shaft speed exceeds the threshold rotational speed by covering at least a portion of the cross-section of the radial hole in the rotor shaft.

In another exemplary aspect, the restrictor reduces the flow of liquid in stages by reducing a flow of liquid through the radial hole to a first level at a first predetermined threshold rotational speed and to a second level at a second predetermined threshold rotational speed. The first level of liquid flow is greater than the second level of liquid flow and the first predetermined threshold rotational speed is less than the second predetermined threshold rotational speed.

In another exemplary aspect, the restrictor includes a first restrictor arm axially extending within the rotor shaft and having a first level of radially inward bias and a second restrictor arm axially extending within the rotor shaft and having a second level of radially inward bias that is greater than the first level of radially inward bias.

In this manner, the flow of liquid is sufficient to remove the vehicle propulsion system, but is not so excessive so that potential spin losses are minimized. Additionally, the necessity for providing hydraulic valves and the systems required to support such valving is obviated.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 3A is a cross-section view of an electric motor rotor shaft with an exemplary liquid flow restrictor in a first configuration;

FIG. 3B is a cross-section view of an electric motor rotor shaft with an exemplary liquid flow restrictor in a second configuration;

FIG. 4 is a perspective view of a restrictor in accordance with an exemplary embodiment of the present invention;

FIG. 5 is a plan view of an electric motor rotor shaft with the restrictor of FIG. 4;

FIG. 6 is a plan view of an electric motor rotor shaft with another exemplary restrictor;

FIG. 9 is a graph illustrating a flow of liquid through the rotor shaft radial hole with a staged restrictor.

DETAILED DESCRIPTION

Figure 1:
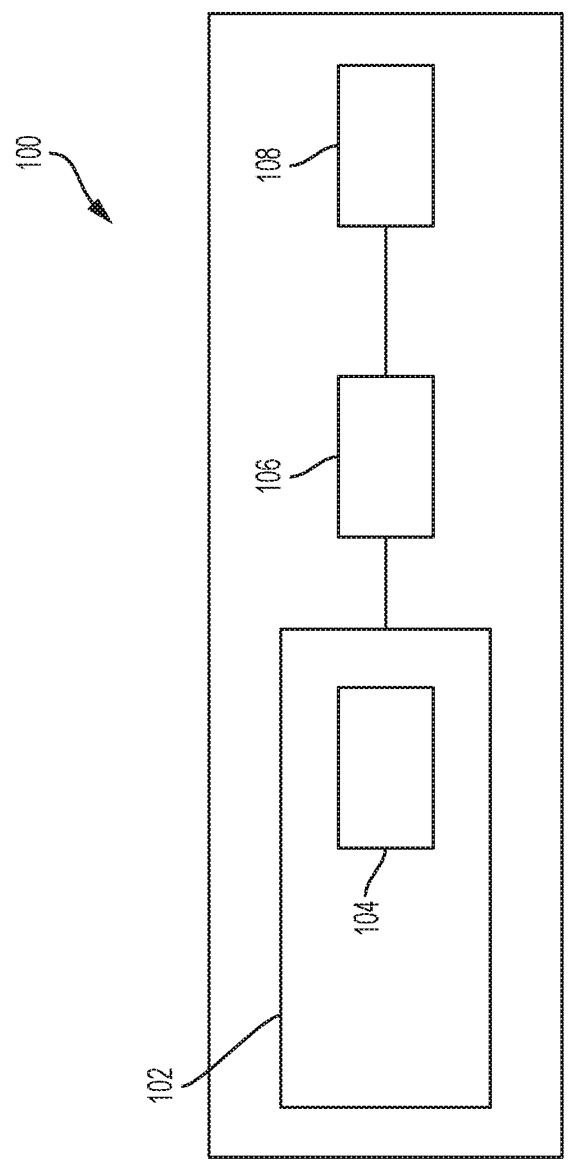
FIG. 1 is a schematic illustration of an exemplary vehicle with a propulsion system.

FIG. 1 is a schematic illustration of a vehicle 100 that includes a propulsion system in accordance with the present invention. The vehicle 100 includes a prime mover 102 that may have an electric motor 104. The prime mover 102 generates torque that is provided to a transmission 106 and subsequently to a drive member 108, such as, for example, a wheel, for propelling the vehicle.

Figure 2:
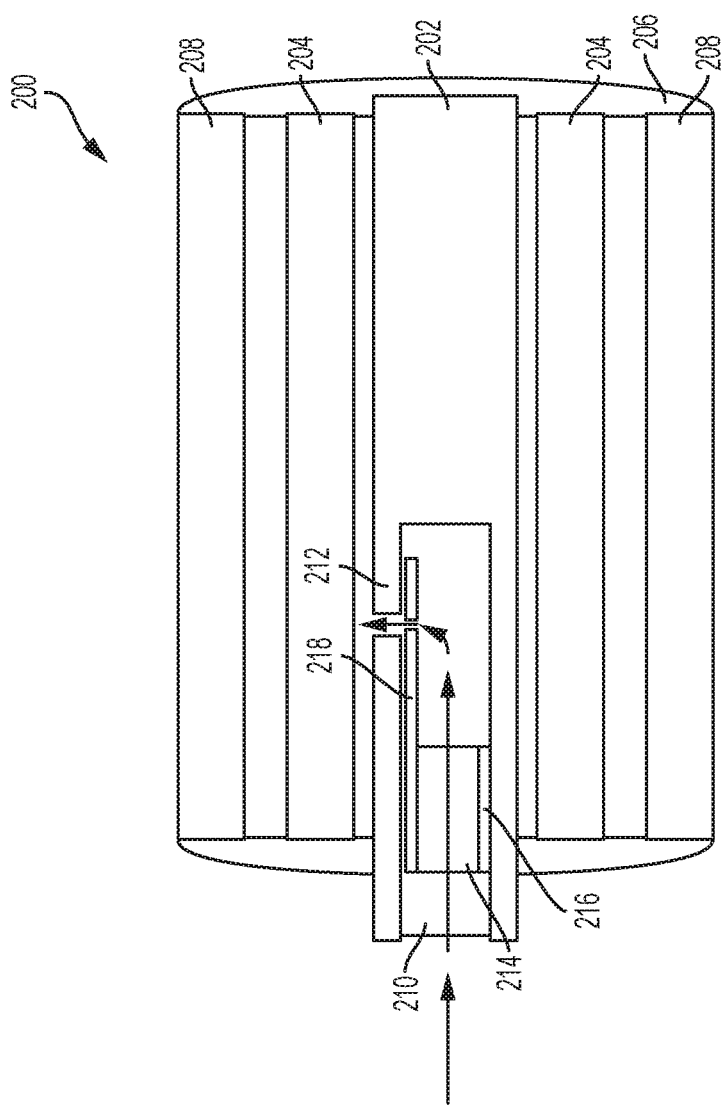
FIG. 2 is a schematic cross-sectional illustration of an electric motor for the propulsion system of FIG. 1.

FIG. 2 is a schematic illustration of an exemplary electric motor 200. The motor 200 includes a rotatable rotor shaft 202 on which is mounted a rotor 204. The rotor shaft 202 and rotor 204 are rotatable within a housing 206 of the motor 200. The motor further includes a stator 208 that remains stationary within a housing 206 of the motor 200. The rotor shaft 202 defines a cavity 210 and a radial hole 212 extending from the cavity 210 to a radially external surface of the rotor shaft 202. A flow of liquid coolant or lubricant may be provided to the cavity 210, as indicated by the non-numbered arrowed lines, that radially exits from the rotor shaft 202 via the radial hole 212 so that the rotor 204 and stator 208 may receive a supply of liquid coolant or lubricant to remove heat generated during operation of the motor 200. As the rotor shaft 202 spins, the liquid coolant or lubricant introduced into the cavity may be drawn out of the radial hole 212 by centrifugal force and/or pushed through the radial hole 212 with the assistance of a pump (not shown).

Positioned within the cavity is a restrictor 214. Referring also to FIG. 4, the restrictor 212 includes a cylindrical section 216 and an arm 218 axially extending from the cylindrical section 216. The arm 218 includes a restrictor hole 220 near an end of the arm 218. The cylindrical section 216 may be configured such that the restrictor 214 is positioned within the cavity 210 to align the restrictor hole 220 with the radial hole 212 of the rotor shaft 202. The restrictor hole 220 may be smaller in area than the radial hole 212 in the rotor shaft 202 so that it provides a greater resistance to flow of liquid coolant or lubricant than the radial hole 212. FIG. 2 illustrates a configuration in which the arm 218 is in a deployed or activated configuration.

FIG. 5 illustrates another view of a portion of rotor shaft 202 and restrictor 214. In particular, FIG. 5 may illustrate more clearly how the restrictor 214 may provide greater resistance to a flow of liquid coolant or lubricant than the radial hole 212. In this particular embodiment, the restrictor arm 218 has a hole 220 which is smaller than the radial hole 212. It is to be understood that the present invention contemplates any configuration of restrictor which may be actuated by centrifugal force such that it provides an additional resistance to flow of liquid coolant or lubricant from a radial hole of the rotor shaft without limitation. For example, another exemplary embodiment of a restrictor 600 having an arm 602 which provides an additional resistance to flow of liquid coolant or lubricant through radial hole 604 of the rotor shaft 606 is illustrated by FIG. 6. In the deployed configuration illustrated by FIG. 6, the restrictor arm 602 extends across and into the cross-sectional area of the radial hole 604, thereby adding a restriction which resists the flow of liquid coolant or lubricant. Again, the specific shape or configuration of the arm of the restrictor is unlimited, rather, the shape or configuration only needs to increase the restriction of flow through the radial hole of the rotor shaft in response to increasing rotational speed (e.g., in response to increasing centrifugal force).

Referring now to FIGS. 3A and 3B, another exemplary embodiment of another restrictor 300 in a rotor shaft 302 that has two radial holes 304 is illustrated in cross-section. FIG. 3A shows a configuration in which the arms 306 of the restrictor 300 are not deployed or activated such that the restrictor holes 308 in the arms 306 are in a position to restrict a flow of liquid coolant or lubricant through the radial holes 304. In contrast, FIG. 3B shows a configuration in which the arms 306 of the restrictor 300 are deployed or activated such that the restrictor holes 308 are positioned to restrict a flow of liquid coolant or lubricant through the radial holes 304. In an exemplary embodiment, the arms 306 of the restrictor are biased to hold the position/configuration illustrated in FIG. 3A. During operation, as the rotor shaft 302 spins, the centrifugal force on the arms 306 will oppose the bias and the arms will gradually move toward and eventually the reach the position/configuration of FIG. 3B once the centrifugal force is sufficient to fully overcome the bias of the arms 306.

While FIG. 2 illustrates a rotor shaft 202 having only a single radial hole 212 and a restrictor 214 having a single arm 218 and FIG. 3 illustrates a rotor shaft 302 having two radial holes 304 and a restrictor 300 having two arms 306, it is to be understood that the present invention is not limited to any number of radial holes or arms.

Further, in some electric motors a supply of liquid coolant or lubricant may be provided through a plurality of differently sized radial holes in the rotor shaft. At higher speeds, the increased flow through the larger hole(s) may undesirably scavenge or starve the smaller hole(s). This problem may be especially an issue in colder conditions where the increased viscosity of the fluid at the colder temperatures may make it more difficult to provide an adequate supply through a smaller hole. The present invention may regulate the supply of coolant or lubricant through the holes such that scavenging and/or starving of the supply to any of the plurality of holes may be better controlled or entirely avoided.

Figure 7:
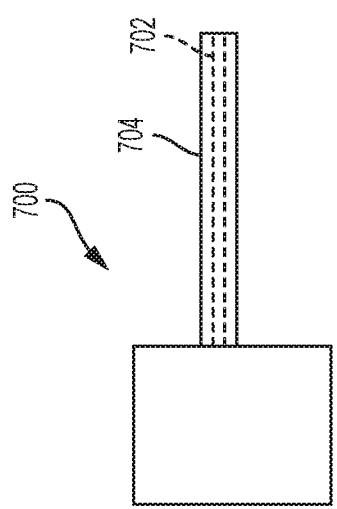
FIG. 7 illustrates an exemplary staged restrictor.

FIG. 7 illustrates another exemplary embodiment of a restrictor 700 in accordance with the present invention. The restrictor 700 is a "staged" type of restrictor and has two arms 702 and 704, one overlapping the other from the perspective presented in the figure. The first arm 702 may be narrower than the second arm 704 such that the first arm, when deployed or actuated, provides less of a restriction to flow through a radial hole in a rotor shaft (not shown), in which it may be positioned, than the second arm 704, when the second arm 704 is deployed or actuated. Further, the first arm 702 may be biased less than the second arm 704 such that the centrifugal force will cause the first arm 702 to deploy before the second arm 704. In this manner, the restrictor may "stage" the restriction to flow such that, as the rotational speed of the rotor shaft increases, the restrictor 700 gradually increases the resistance to flow in stages. The restrictor 700 of FIG. 7 accomplishes the staged restriction by varying the width and bias of the arms 702 and 704.

Figure 8:
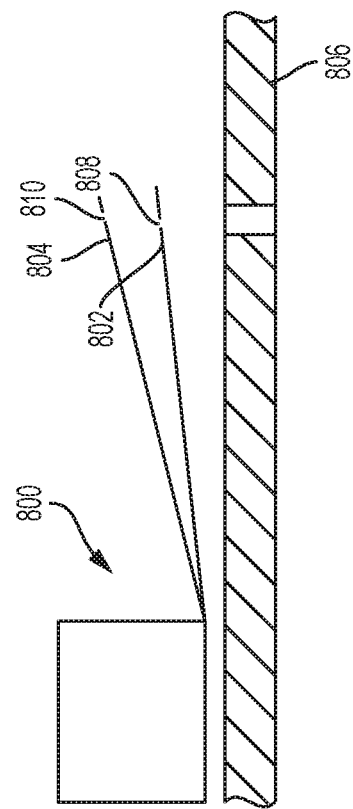
FIG. 8 illustrates another exemplary staged restrictor.

In a similar manner, another exemplary embodiment of a restrictor 800 includes two arms 802 and 804. In contrast to FIG. 7, FIG. 8 illustrates the restrictor 800 and an associated portion of a rotor shaft 806 in cross-section from a side perspective. Just like the restrictor 700, the restrictor 800 includes a first arm 802 and a second arm 804 where the second arm 804 "overlaps" the first arm 802. Further, and similarly, the first arm 802 may be biased less than the second arm 804 such that an increase in centrifugal force as the rotor shaft spins faster will cause the first arm 802 to deploy before the second arm 804. In this manner, the restrictor may "stage" the restriction to flow such that, as the rotational speed of the rotor shaft increases, the restrictor 800 gradually increases the resistance to flow in stages. In contrast to the restrictor 700, the restrictor 800 relies upon a variance in the size of the holes in the arms 802 and 804 to provide the increasing resistance. The hole 808 in the arm 802 is larger than the hole 810 in the arm 804. Therefore, the restrictor 800 of FIG. 8 accomplishes the staged restriction by varying the size of the holes and the bias of the arms 802 and 804.

FIG. 9 is a graph 900 illustrating the relationship between a volume of flow of liquid coolant or lubricant through a radial hole in a rotor shaft on the vertical axis 902 and the rotational speed of the rotor shaft on the horizontal axis in a system which includes a staged restrictor, such as illustrated, for example, in either of FIGS. 7 and 8. As the rotational speed of the rotor shaft increases, the flow of liquid coolant or lubricant through the radial hole gradually increases until the speed reaches a point where the centrifugal force is sufficient to overcome the bias on a first arm in a restrictor. As a result, the first arm restricts the flow and, thus, reduces the flow through the radial hole. As the speed continues to increase, eventually the speed reaches a point where the centrifugal force is sufficient to overcome the bias of a second arm in a restrictor, which then further increases the restriction and again reduces the volume of flow. In general, providing a staged restrictor in this manner may more closely align the flow of liquid coolant or lubricant to the electric motor to the actual heat removal requirements and reduce the amount of "excessive" flow of coolant or lubricant which would only serve to increase the spin losses and reduce the fuel economy of the vehicle.

The present invention may also be advantageous for those vehicle propulsion systems which may have a limited or no hydraulic system with which to control a valving system to regulate the flow of fluid through a motor. In those vehicle propulsion systems having such a hydraulic system, regulation of flow may be performed through hydraulic control over a valve system. The present invention provides the ability to regulate the flow independently and without the need to provide a hydraulic or otherwise controlled regulation system. This may obviate the necessity to provide such an expensive, complex hydraulic system which requires energy to operate. The present invention provides a passive mechanical system that does not consume energy to regulate the flow.

Further, while the above-described embodiments were described in the context of lubrication and/or cooling of electric motors, it is to be appreciated and understood that the present invention may also be advantageously used in any other vehicle propulsion system component without limitation. For example, a propulsion shaft for a low speed towing application may incorporate a similar system which relies upon a radial hole in the wall of a cavity to supply a lubricating fluid for a bushing. Regulation of the supply of fluid with a retainer that is responsive to an increase in rotational speed to regulate or restrict the flow of that fluid to that system would also be valuable.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle propulsion system, the system comprising:
   a drive member;
   a transmission coupled to the drive member;
   a prime mover coupled to the transmission, wherein the prime mover includes a rotor shaft defining a cavity within the rotor shaft and a radial hole extending from the cavity to an external surface of the rotor shaft; and
   a restrictor that reduces a flow of liquid through the radial hole in response to a rotational speed of the hollow rotor shaft exceeding a predetermined threshold rotational speed.

2. The system of claim 1, wherein the restrictor reduces the flow in response to a centrifugal force exceeding a predetermined threshold.

3. The system of claim 1, wherein the restrictor comprises a cylindrical portion configured to position the restrictor within the cavity.

4. The system of claim 1, wherein the restrictor comprises a restrictor arm axially extending within the rotor shaft cavity.

5. The system of claim 4, wherein the restrictor arm defines a restrictor hole that is smaller in cross-section than the radial hole in the rotor shaft.

6. The system of claim 4, wherein a width of the restrictor arm adjacent to the radial hole is less than a distance across the radial hole in a direction aligned with the width of the restrictor arm.

7. The system of claim 4, wherein the restrictor arm comprises a spring steel arm with an extent that is biased radially inward away from the radial hole.

8. The system of claim 1, wherein the restrictor reduces the flow of liquid when the rotor shaft speed exceeds the threshold rotational speed by covering at least a portion of the cross-section of the radial hole in the rotor shaft.

9. The system of claim 1, wherein the restrictor reduces the flow of liquid in stages by reducing a flow of coolant through the radial hole to a first level at a first predetermined threshold rotational speed and to a second level at a second predetermined threshold rotational speed, wherein the first level of coolant flow is greater than the second level of coolant flow and the first predetermined threshold rotational speed is less than the second predetermined threshold rotational speed.

10. The system of claim 9, wherein the restrictor comprises:
    a first restrictor arm axially extending within the rotor shaft and having a first level of radially inward bias; and
    a second restrictor arm axially extending within the rotor shaft and having a second level of radially inward bias that is greater than the first level of radially inward bias.

11. A vehicle propulsion system, the system comprising:
a rotor shaft defining a cavity within the rotor shaft and a radial hole extending from the cavity to an external surface of the rotor shaft; and
a restrictor that reduces a flow of liquid through the radial hole in response to a rotational speed of the hollow rotor shaft exceeding a predetermined threshold rotational speed.

12. The vehicle propulsion system of claim 11, wherein the restrictor reduces the flow in response to a centrifugal force exceeding a predetermined threshold.

13. The vehicle propulsion system of claim 11, wherein the restrictor comprises a cylindrical portion configured to position the restrictor within the cavity.

14. The vehicle propulsion system of claim 11, wherein the restrictor comprises a restrictor arm axially extending within the rotor shaft cavity.

15. The vehicle propulsion system of claim 14, wherein the restrictor arm defines a restrictor hole that is smaller in cross-section than the radial hole in the rotor shaft.

16. The vehicle propulsion system of claim 14, wherein a width of the restrictor arm adjacent to the radial hole is less than a distance across the radial hole in a direction aligned with the width of the restrictor arm.

17. The vehicle propulsion system of claim 14, wherein the restrictor arm comprises a spring steel arm with an extent that is biased radially inward away from the radial hole.

18. The vehicle propulsion system of claim 11, wherein the restrictor reduces the flow of liquid when the rotor shaft speed exceeds the threshold rotational speed by covering at least a portion of the cross-section of the radial hole in the rotor shaft.

19. The vehicle propulsion system of claim 11, wherein the restrictor reduces the flow of liquid in stages by reducing a flow of coolant through the radial hole to a first level at a first predetermined threshold rotational speed and to a second level at a second predetermined threshold rotational speed, wherein the first level of coolant flow is greater than the second level of coolant flow and the first predetermined threshold rotational speed is less than the second predetermined threshold rotational speed.

20. The vehicle propulsion system of claim 19, wherein the restrictor comprises:
a first restrictor arm axially extending within the rotor shaft and having a first level of radially inward bias; and
a second restrictor arm axially extending within the rotor shaft and having a second level of radially inward bias that is greater than the first level of radially inward bias.

* * * * *